March 22, 1938.  N. SCHWARTZ  2,112,213
FILTER TYPE RESPIRATOR
Filed Dec. 3, 1935   2 Sheets-Sheet 1

INVENTOR
Nathan Schwartz

March 22, 1938.  N. SCHWARTZ  2,112,213
FILTER TYPE RESPIRATOR
Filed Dec. 3, 1935   2 Sheets-Sheet 2
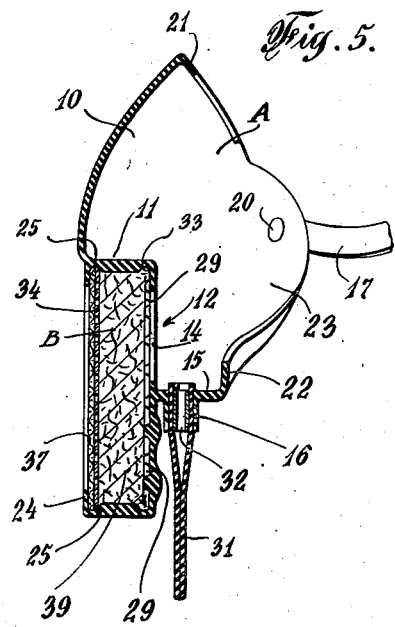
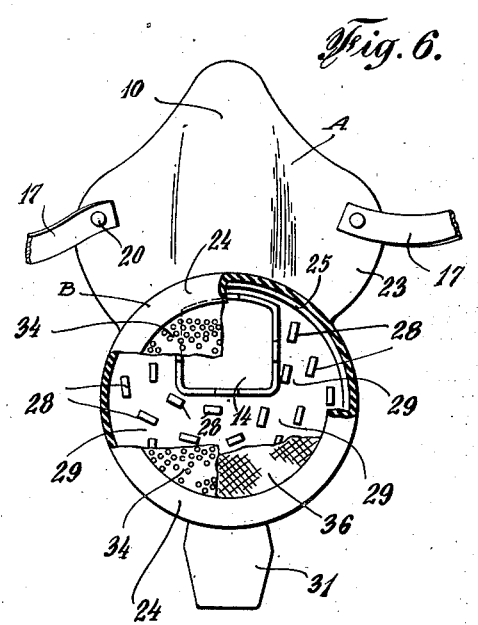
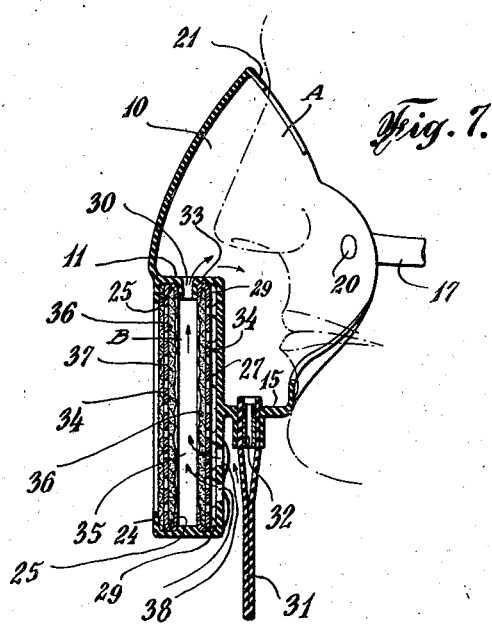
INVENTOR
Nathan Schwartz Patented Mar. 22, 1938

2,112,213

UNITED STATES PATENT OFFICE 2,112,213

FILTER TYPE RESPIRATOR

Nathan Schwartz, New York, N. Y.

Application December 3, 1935, Serial No. 52,627

6 Claims. (Cl. 128—146)

This invention relates to filter type respirators adapted to cover the nose and mouth for the purpose of protection against dust, fumes, gases and bacteria, and is a modification of my co-pending patent application Serial Number 44,694, filing date October 12, 1935 now Patent No. 2,070,241.

The object of this invention is to increase the filtering efficiency of filter type respirators by means of locating filters advantageously. That is the positioning of the filters in such relation to each other as to obtain increased filtering efficiency without effecting a corresponding increase in the resistance to air flow.

Another object of this invention is to simplify construction by including the filter unit and face part of the respirator in one mold cavity.

Another object of this invention is to make the respirator practical for dry filtration as well as for wet sponge filtration.

Another object of this invention is to increase the filtering area by providing for air space between the filter support and the molded rubber support.

With the above and other objects in view, the invention is more particularly disclosed in the following specification and the accompanying drawings wherein a preferred embodiment exemplifies the invention, while the appended claims cover variations and modifications thereof.

In the drawings:

Figure 5 is a similar cross section at the line 4—4 of Figure 3, but a combination of gauze and sponge filter is shown.

Figure 6 is an anterior view and it shows the interior side of the rear wall of the filter ring and sectionally shows the foraminous support covering the interior of the rear wall, and also the filter material attached to the foraminous support.

Figure 7 is a cross section, like Figures 4 and 5 but it shows the third form of this invention, namely the filtration area is enlarged and air is entering the filter device at front and at rear.

Figure 1:
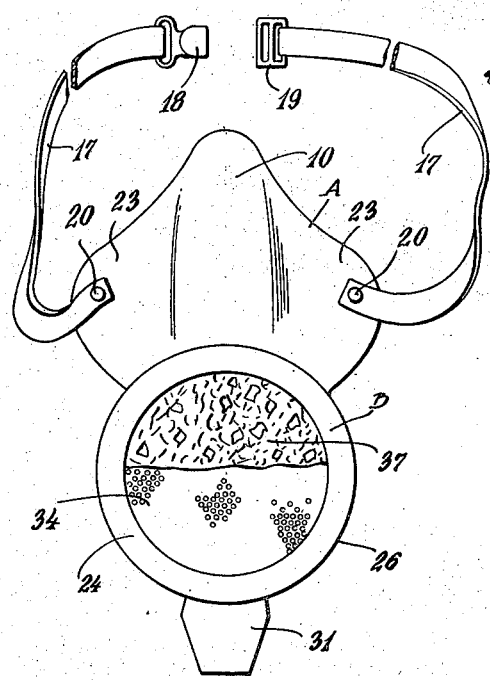
Figure 1 is an anterior view of the improved respirator showing the face part of the respirator having attached thereto elastic bands, and also showing the ring filter unit at the lower part of the face piece.
Figure 2:
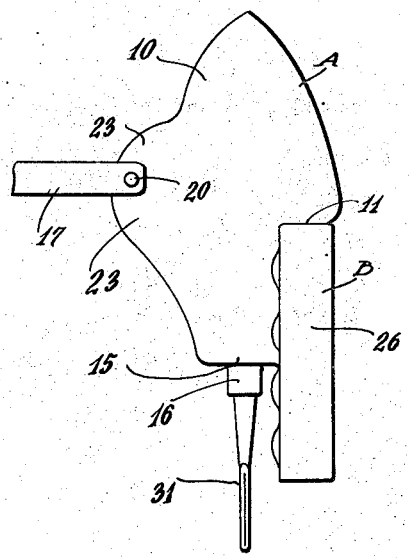
Figure 2 is a side view of the same.
Figure 3:
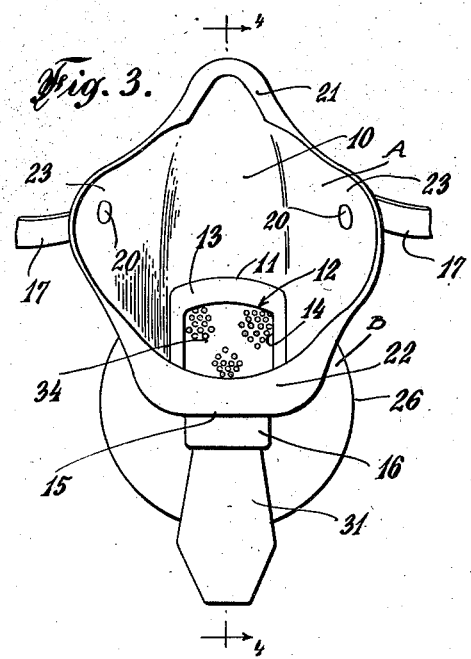
Figure 3 is a rear view thereof.

Referring to the drawings by character reference, the respirator includes a face piece designated generally by the reference character A and a filter unit designated generally by the reference character B, and the face piece being preferably constructed of molded rubber or an equivalent flexible material having the properties and characteristics of rubber. The face piece conforms generally to the shape of the face in the region of the nose and mouth and is formed with a hollow nose covering portion 10 having a lower horizontal wall 11. The mouth and chin covering portion 12 is provided with an opening 14 and is set back and it constitutes part of the rear wall of the ring filter unit B. The lower horizontal wall 11 also constitutes part of the circumferential wall of the ring filter unit B. The mouth covering portion 12 is provided with a vertical wall 13 which in one form of these type respirators contains an opening 14. The mouth covering portion is stepped back at its chin part in a substantial horizontal position 15 and it contains a depending tubular boss 16.

The face piece has attached at the sides thereof a webbing fabric material 17 which webbing band has at its end, hooks 18 and ring 19 by which means the respirator is fastened to the face of the wearer.

The filter ring B is constructed of the same material as the face piece A and they are molded in a single cavity mold and are therefore dependent on one another and are joined in the said mold cavity at the mouth covering vertical portion 13 and also at the lower wall set back 11 of the nose covering portion 10.

In Figure 1 is clearly shown the anterior view, and the webbing band attachment 20 indicates manner of attachment of the webbing or elastic band 17 to the face piece A of the respirator. The face piece is also provided with a nose flange 21 which is adapted to engage the nasal face portion and it also has a chin flange 22 adapted to engage the face at the chin part of the face and it has provided side flaps 23 for engaging the face at cheek portion.

The filter ring part B has anteriorly an inwardly directed flange 24 and this flange forms the outer wall of the external circumferential groove 25. The filter ring has a circumferential wall 26 which in one part is a section of lower nose covering wall 11. The rear wall 27 of the filter ring is in part joined with the vertical section 13 of the mouth covering portion 12, and in one form of this invention contains an opening 14 for the inhalation of filtered air. The rear wall 27 has provided at its inner side, interrupted rib elevations 28 which cause the formation of grooves 29 and which grooves 29 become uninterrupted and form a continuous air flow space 29. The lower horizontal wall 11 of the nose covering portion 10 is a part of the ring circumferential wall 26 and in one form of this invention contains an opening 30 which connects the ring filter B with the face piece of the respirator A.

The lower horizontal wall 15 contains an opening in the tubular boss 16, within this tubular boss 16 is inserted a flutter valve which is kept open by a comparatively rigid metal tube 32. The flutter valve's usefulness is the permitting of easy exhalation.

The ring filter unit which we designate with the character reference B has at its internal portion and at the outer edge a circumferential groove 25 and it also is provided with a similar internal groove 33 and the rear wall 27 defines its outer side. The rear wall 27 also has rib elevations 28 and grooves 29. It also contains the opening 14 for air passage to the face part of the respirator. The grooves 25 and 33 contain the foraminous supports 34, these foraminous supports are preferably of metal construction and are comparatively rigid so that there is a firm supporting hold for the filters and for the maintenance of the air chamber 35, which is located between them. Both foraminous supports 34 have attached filter elements 36 which filter materials are usually of textile or felt fabric. The attachment of the filter material is usually made at the edge circumference of the foraminous support 34. In one form of this invention an extra removable filter fabric material 37 is inserted, and it forms a front filter. In another form of this invention a sponge filter 39 is used and its insertion into the ring filter B takes place through the opening 14.

In my copending patent application Serial Number 44,694 the face piece A is separate from the ring filter unit B and the two are joined at the opening in the set back horizontal wall 11. The need in some instance for a separate ring filter unit is that more and thicker filter materials may be used and conveniently so used. Therefore in the dry filter type respirators this type, namely the type with the joined ring filter unit, has a decided value for use as protection against dangerous dust or fumes where the requirement for separation is very high. That is where it is required to filter almost 100% of the foreign substance. However, the said type respirators, namely those having separate ring filter units, are not practical for moist filtration, that is, a sponge filter cannot be accommodated. But, with the present modified invention such a sponge filter can be accommodated. Sponge filters are often needed in case a neutralizing solution is desired. The present modification is less costly due to labor saving. Time is required to join the face piece and the ring filter unit.

The present modification and improvement may be used in three different forms.

Figure 4:
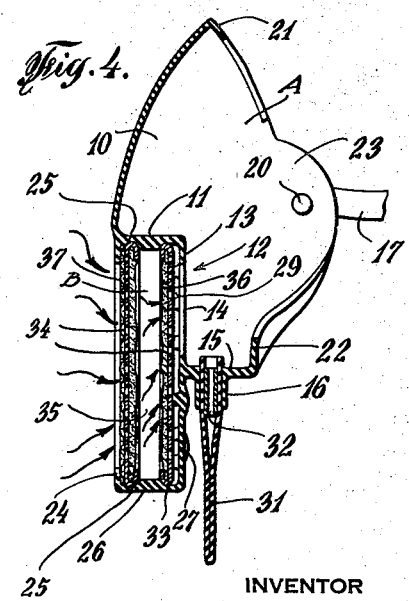
Figure 4 is a vertical sectional view therethrough taken approximately in the line 4—4 of Figure 3, and it shows front and rear filter elements having an intervening air chamber.

One form is clearly shown in Figure 4, which is a cross section. The air intake in this form is at the opening 14 which opening is in the vertical wall 13 of the mouth covering portion 12. The air is filtered by means of filter element 37, thence the air passes to the air chamber 35, then it is again filtered by the filter element 36, then it passes through the foraminous support 34, then into the grooved air space 29 and the opening 14, as is indicated in Figure 4, by the arrows. An advantage is present in the fact that the air is made to pass two filters separated by an air chamber.

The second form of this invention is clearly shown in Figure 5. Here we have the air passing through the filter material 37, then the foraminous support 34, then the sponge filter material 39, whence it converges at opening 14 and is filtered and ready for inhalation, the sponge type of filters is desired when solvents or neutralizers are required in a respirator. For example at acid works, an alkaline solution is beneficial.

The third form of this invention is plainly shown in Figure 7. Here we have doubled the surface area of filtration. Air is entering as indicated by the arrows, through the filter element 37, and also through the hole openings 38 which are present in the rear wall 27. The air entering in the openings 38 fills the air space groove 29 and is filtered in its passage through the filter material 36. The interrupted ribs 28, make the continuous uninterrupted groove 29 and therefore the surface area at the rear filter is equal to the surface area at the front filter. Therefore the resistance to air flow is diminished about 50% and therefor the filter material may be increased in density or an additional filter layer may be added, and thereby greater efficiency may be obtained. If greater efficiency is not required then there is still greater ease in breathing and therefore the improvement is still apparent.

In Figure 6, it is clearly shown that the interrupted elevated ribs 28 form an uninterrupted groove 29 which groove is continuous to the opening 14. The need of this arrangement is present in the first and third forms of this type of improved respirators and the reason therefore is that it provides a greater filtering area. In Figure 4 and in Figure 7, arrows indicate air flow in the said grooves.

The horizontal set back below the nose line of the respirator is a distinct feature in this improved respirator as well as in my improved respirator described in my copending application for United States Letters Patent, Serial Number 44,694, filing date, October 12, 1935. The said horizontal set back 11 is clearly shown in Figures 2, 3, 4, 5, and 7 and this set back is made with the object in view, that the vision of the wearer of the respirator shall have no downward obstruction. Because frequently on floors of workrooms where respirators are worn there are tools and other materials and if these become unseen due to a respirator obstruction they may cause tripping and falling.

What is claimed is:

1. A filter type respirator including a face part having a hollow nose covering portion formed with a lower wall and a set back mouth and chin covering portion and a filter unit located under said nose covering portion and in front of the mouth and chin covering portion, and the filter unit comprising a casing and the said casing being an integral part of the face piece of the respirator at the horizontal nose covering portion and at the vertical chin and mouth covering portion, and the filter unit having communication with the face part of the respirator by means of an opening in the mouth and chin covering portion.

2. A filter type respirator having means provided for engaging the face of the wearer and having a hollow mask face portion, including a nose covering portion, formed with a lower wall and a set back mouth and chin covering portion, a circumferential wall being a part of the lower wall of the nose covering portion and extending downward therefrom and forming a ring, the said circumferential wall having a rear wall which in part is the set back mouth and chin covering portion, the said rear wall having an opening provided at the set back mouth and chin covering part, the said circumferential wall having at its anterior, annular inwardly directed flanges and internal grooves defined in part by said flanges, filter elements and foraminous support therefor located within said groove and the filter element retained in place by the said inwardly directed flanges.

3. A filter type respirator having means provided for engaging the face of the wearer and having a hollow mask face portion, including a nose covering portion, formed with a lower wall and a set back chin and mouth covering portion, a circumferential wall being a part of the lower wall of the nose covering portion and extending down therefrom and forming a ring, the said circumferential wall having a rear wall which in part is the set back chin and mouth covering portion, the said rear wall containing at its interior side interrupted elevations for the formation of uninterrupted air flow grooves, the said circumferential wall having at its internal rear end a circumferential groove formation, the said groove formation is defined in part by the rear wall of the circumferential wall, the said circumferential wall having at its anterior, annular inwardly directed flanges, filter elements and foraminous support therefor located within said groove and the filter element retained in place by the said flanges and an opening provided between the ring filter and the hollow mask body.

4. A filter type respirator having means provided for engaging the face of the wearer and having a hollow mask face portion, including a nose covering portion and a set back chin and mouth covering portion, a circumferential wall being a part of the lower wall of the nose covering portion and extending therefrom downward and forming a casing and the said casing ring having a rear wall which in part is the set back chin and mouth covering portion, the said casing being provided with suitable filter element which filter element is properly located within the said casing and the said casing having an opening connection with the hollow mask portion.

5. A filter type respirator having a hollow mask face body, the said hollow mask face body having a set back below the nose line and an opening for air intake located in said set back and having direct connection at the said opening with a filtering device which includes a casing, part of which casing is an integral part of the face body and which casing is provided at its intake with a circumferential groove for containing a supporting foraminous element and a filter material removably placed anteriorly to said foraminous support and held in place by means of inwardly directed flanges.

6. A filter type respirator having a hollow mask face portion wherein is provided a set back below the nose line, a filtering device partly located within the outer portion of said set back and also parts of the walls of the filtering device are simultaneously parts of the walls of the set back portion, and the said filtering device having a circumferential wall and the circumferential wall having grooves located internally at the edges and the forward groove is defined by anterior inwardly directed flanges, at its anterior part and the rear groove is defined by the rear wall of the filtering device, which rear wall forms the posterior part of the groove, and the said rear wall being provided with interrupted elevated ribs and between said ribs are formed groove formations, and said rear wall having holes provided at its lower section for air intake purposes, foraminous supports having attached filter materials closely held by the grooves located at the edges of the circumferential wall, an opening provided for air intake located in the horizontal portion of the set back and the said opening connecting with the air chamber formed between the two foraminous support elements which support elements have filter materials attached.

NATHAN SCHWARTZ.